United States Patent Office 3,553,024
Patented Jan. 5, 1971

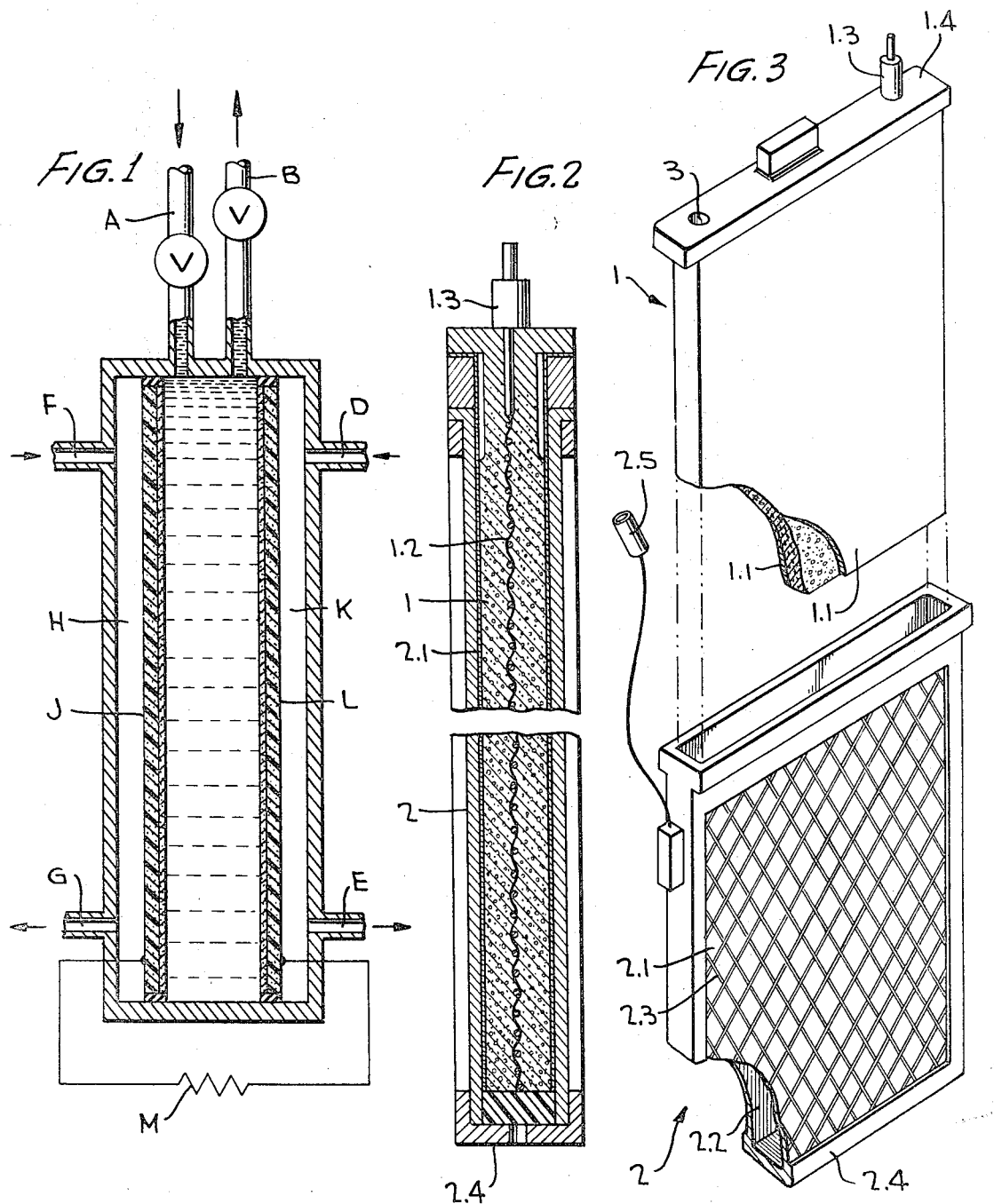

3,553,024
ELECTROCHEMICAL DEVICE UTILIZING AN ELECTRODE COMPRISING A CONTINUOUS PTFE FILM WHICH IS GAS PERMEABLE AND FREE FROM LIQUID ELECTROLYTE SEEPAGE
Jerry Haskel Fishman, New York, N.Y., assignor to Leesona Corporation, Warwick, R.I., a corporation of Massachusetts
Filed Feb. 20, 1967, Ser. No. 617,244
Int. Cl. H01m 13/00, 27/00
U.S. Cl. 136—86           19 Claims

ABSTRACT OF THE DISCLOSURE

An improved electrode for use in electrochemical cells and electrochemical cells utilizing the improved electrodes are described. The improvement resides in the use of an unsintered polytetrafluoroethylene film in contradistinction to a sintered polytetrafluoroethylene film in an electrode construciton. The unsintered polytetrafluoroethylene film is adjacent a catalyst layer. The electrodes provide enhanced electrochemical performance and stability in the electrochemical cell.

FIELD OF INVENTION AND PRIOR ART

This invention relates to improved electrodes for use in electrochemical cells, to the method of making the improved electrodes, and to the electrochemical cells employing the electrodes. More particularly, the invention relates to electrodes comprising an unsintered polytetrafluoroethylene film in contact with an electrocatalyst. The catalyst layer in contact with the continuous unsintered polytetrafluoroethylene film perferably comprises an intimate admixture of hydrophobic fluorocarbon polymer or silicone rubber and electrocatalyst.

The advantages of lightweight electrodes for use in electrochemical cells such as fuel cells and metal/air batteries have been recognized. Such electrodes normally comprise a porous support coated with a catalystic material such as a dispersion of noble metal black and hydrophobic polymer, or a continuous hydrophobic film in contact with an electrocatalyst. The electrodes are extremely thin having low internal electrical resistance and, furthermore, take up only a very small amount of space permitting the construction of highly compact cells having a high energy to volume and energy to weight ratio. The prior teachings have indicated the need to, or have processed the structures to obtain electrodes where the hydrophobic polymer film is sintered or crystalline. Although it is recognized that sintered polytetrafluoroethylene films are virtually impermeable to gases, gas premeability is obtained by heat treatment at temperatures above about 330° C. to produce small breaks in the film which permits gas diffusion. Heretofore it was believed that crystallinity or a sintered structure was essential to obtain gas permeability and/or for mechanical integrity.

OBJECTS OF THE INVENTION AND GENERAL DESCRIPTION

It has now been discovered that greatly enhanced results are obtainable in an electrochemical cell by using unsintered polytetrafluoroethylene (PTFE) in the construction of electrodes. It has been assumed that unsintered polytetrafluoroethylene, like sintered polytetrafluoroethylene, would be gas permeable only to a limited extent. Surprisingly, however, unsintered PTFE permits the necessary gas diffusion and eliminates electrolyte leakage and seepage experienced with electrodes using sintered polytetrafluoroethylene. The aforesaid electrolyte seepage which occurs, particularly in cells employing a free-flowing electrolyte, not only decreases the electrochemical performance of the cell but decreases the stability of the cell due to electrolyte loss.

Accordingly, it is an object of the present invention to provide an improved lightweight electrode for an electrochemical cell which has high electrochemical activity.

It is another object of the present invention to provide an improved lightweight electrode for an electrochemical cell which has a high rate of gas permeability but is free from electrolyte or liquid water seepage.

It is another object of the present invention to provide an improved lightweight electrode which can be employed in an electrochemical cell utilizing a free flowing electrolyte without suffering from electrolyte loss.

It is another object of the present invention to provide an improved process for the construction of the aforesaid lightweight electrodes.

These and other objects of the invention will be more readily apparent from the following detailed description with particular emphasis being placed on the working examples.

The objects of the present invention are accomplished by fabricating an electrode utilizing an unsintered polytetrafluoroethylene continuous film as a liquid impermeable barrier. An electrocatalyst is uniformly applied to the film. The unsintered PTFE film is milky-white, opaque, cohesive and porous. The film has a specific gravity in the range of from about 1.2 to 1.9 and preferably has a thickness of from 0.5 mils to 20 mils. The optimum thickness is from about 4 to 7 mils from the standpoint of air permeability and structural integrity. The preparation of the unsintered film is described fully in the Du Pont de Nemours & Company Technical Bulletin TR No. 148 of the Technical Service Laboratory of the Plastics Department. The material is soft, flexible and can be stretched. The continuous film will rapidly diffuse a gas such as oxygen, propane, hydrogen, and the like, but is an excellent barrier to liquids of the type employed as the electrolyte in electrochemical cells such as aqueous alkali hydroxides, aqueous solutions of sulfuric acid, phosphoric acid, and the like. At temperatures of 327° C. or above, sintering will occur, modifying the characteristics of the film.

In contradistinction, sintered or heat treated PTFE films are not nearly as opaque, or less flexible, will not stretch extensively, and, most critically, will only diffuse gases to a limited extent. In order to obtain sufficient gas diffusion for use in an electrochemical cell, it is necessary that the material be heat treated at a temperature sufficient to produce hairline cracks or breaks, i.e., at temperatures above about 330° C. Although these cracks or breaks in the film permit gas diffusion, they also permit leakage or seepage of liquids. Accordingly, an electrochemical cell employing the electrodes, while initially demonstrating high performance, deteriorates after continuous operation due to electrode wetting and electrolyte loss.

The aforesaid characteristics of unsintered PTFE are surprising since there is no apparent reason to predict that unsintered PTFE would perform as stated or that the material would possess the necessary structural strength for electrode construction.

The electrodes of the present invention can be prepared by various techniques. More specifically, a wetted mass of electrocatalyst in the form of finely divided particles, or a black, can be rolled onto the PTFE film. In a preferred embodiment, the electrocatalyst is uniformly dispersed with a hydrophobic polymer binder such as colloidal PTFE. The binder not only functions to hold the structure intact, but also to control the reaction interface of the cell. After the hydrophobic polymer-electrocatalyst admixture is rolled onto the film, the entire structure is heat treated to bond the colloidal polymer particles to each other and to the continuous PTFE film. Since the continuous film is unsintered, excellent bonding of the hydrophobic polymer is obtained at low temperatures and slight pressures, particularly when colloidal PTFE is employed. Comparable bonding cannot be obtained using a sintered PTFE film.

In fabricating the electrodes it is not essential to employ heat treatment, however, a heating step is preferred in order to obtain good cohesion of the catalyst to the film, etc. In the event heating is employed, temperatures in the range of from 200° to about 320° C. are preferred. At temperatures below about 200° C., the bonding process is unduly slow; and, furthermore, in the event a surface active agent or the like is contained in the PTFE dispersions, it is not completely removed at temperatures below about 280° C. In any event, the temperature must not be in excess of 327° C. At temperatures above 327° C., the PTFE will sinter, destroying the favorable characteristics of the unsintered PTFE.

Alternative to the rolling technique as described above, the catalyst admixture can be applied to the PTFE film by spraying the catalyst dispersed in a suitable medium such as water, organic solvents, or by applying the catalyst to the film with a doctor's blade or the like. Regardless of the method of applying the catalyst layer to the continuous film, it is usually desirable, although not essential, to apply a light pressure to press the catalyst mixture into intimate contact with the PTFE film before heating. Furthermore, although it is possible to fabricate electrodes consisting of the continuous polytetrafluoroethylene film and catalyst, it is preferred to utilize a porous element, such as a carbon plate, metal screen, expanded metal, porous sinter, and metal felt or mesh in the electrode structure. This element will increse the conductivity of the electrode permitting more effective current take-off and improve the mechanical integrity of the electrode. In embodiments where the porous support is employed, it can be laid over the surface of the continuous PTFE film which has been coated with the catalyst prior to the heating step and the support lightly pressing into the coated film, followed by heating. Alternatively, the catalyst can be applied to the porous support element by rolling or other technique as discussed above in applying the catalyst to the PTFE film and thereafter pressing the catalyst-porous support into contact with the PTFE film, followed by the heat treatment. In embodiments where a metal support element is employed, although it is not essential, it is preferred that the electrode structure be cooled rapidly as for example between cold metal plates. The rapid cooling apparently prevents breaking of bonds between the PTFE and metal element. The breaking of the bond is believed to be a result of the disproportionate thermo-conductivity and thermo-contraction which exists between the metal element and the PTFE film.

The support employed herein must be electrically conductive and able to withstand the corrosive environment of an electrochemical cell. Suitable metal supports which are preferably from 0.5 to 1.0 millimeters thick and having a high porosity, i.e., from 35 to 90 percent, are composed of nickel, copper, iron, titanium, tantalum, gold, silver, alloys and mixtures thereof. Primarily from the standpoint of their exceptional resistance to the corrosive environments of the cell and their relative inexpensiveness, nickel, titanium, and tantalum supports are preferred. Additional porous carbon sinters can be employed.

The electrochemically active material which is to be applied to the unsintered PTFE film can be any of various metals, oxides or metal alloys which favorably influence an electrochemical reaction. Such electrocatalysts include columbium, nickel, iron, gold, copper, palladium, platinum, rhodium, ruthenium, osmium, iridium, silver, amalgams of silver and mercury, alloys thereof and oxides. The particular application of the electrochemical cell will determine to a large extent the catalyst to be selected. For example, the Group VIII metals of the Mendelyeev's Periodic Table are preferred in view of their excellent properties insofar as withstanding the corrosive environment of an electrochemical cell and high electrochemical reactivity. On the other hand, because of the economic factor, the more base metals such as silver, nickel, copper, and the like, or the aforesaid elements amalgamated with mercury are highly desirable.

The load of catalyst on the virgin PTFE film can vary substantially, again depending upon the particular catalyst selected and the ultimate utility of the electrochemical cell. In view of the relative expensiveness of the catalyst, as light a load as possible is frequently desirable. Normally, the metal catalyst will be present at a load of from approximately 0.10 to 30 milligrams per square centimeter. Below the lower limit of the aforesaid range, the current density output of the cell is marginal, and economic factors preclude loadings greater than the upper limit.

The hydrophobic polymer which is dispersed with the electrocatalyst and which performs the dual purpose of a binder and means for controlling the reaction interface is preferably a linear fluorocarbon polymer. Exemplary polymers include PTFE, polytrifluorochloroethylene, polyvinylfluoride, polyvinylidenefluoride, polytrifluoroethylene, co-polymers thereof and the silicone rubbers. However, because of its exceptional hydrophobicity as well as its resistance to heat and the corrosive environment of the electrolyte, polytetrafluoroethylene is preferred. Another advantage realized by using PTFE is the excellent bonding obtained between the colloidal PTFE and the unsintered, continuous PTFE film.

Electrodes prepared with the unsintered PTFE can be employed in electrochemical cells, such as fuel cells, as either the anode or cathode, oriented in order that the continuous film is in contact with the reactant gas and the catalyst is in contact with the electrolyte of the cell. Because of the liquid impermeability of the film, the electrodes can be used with a free-flowing electrolyte, or with an electrolyte trapped in a suitable matrix. In addition to their application in fuel cells, the electrodes have excellent utility as the cathode in metal/air cells. In such application, the unsintered PTFE film is in contact with ambient air or an oxygen supply and the catalytic layer is in contact with the electrolyte of the cell. It has been found that the unsintered PTFE film, quite unexpectedly, is highly resistant to the corrosive environment of electrolytes of the type used in fuel cells and air batteries and are not detrimentally affected even at temperatures of up to about 250° C. Electrolytes operable in the fuel cell and/or air batteries are the alkali metal hydroxides and acid electrolytes such as sulfuric and phosphoric acid.

DRAWING AND DETAILED EXAMPLES WITH REFERENCE TO THE DRAWINGS

Having described the invention in general terms, reference is made to the accompanied drawing wherein FIG. 1 illustrates a cross-section of a fuel cell employing the electrodes of the present invention; and FIGS. 2 and 3 illustrate a metal/air bi-cell. Specific reference to the drawing will be made in the hereinafter examples set forth to more particularly illustrate the invention. In the examples, parts are by weight unless otherwise specified.

EXAMPLE 1

An electrode was constructed as follows: 135 milligrams of platinum black was mixed with a 30 percent aqueous dispersion of PTFE, equivalent to 30 milligrams of PTFE, and worked into a paste. The paste was transferred in lump form to one surface of a continuous, unsintered PTFE film 20 cm. x 10 cm. and 4 mils thick. The paste was spread over the surface of the continuous film by rolling a clean glass rod over it with the application of light hand pressure. The paste formed a remarkably adherent, cohesive, dense appearing film over the PTFE substrate. A piece of platinum gauze substantially the same size as the PTFE film was laid over the coated surface of the film and pressed into the film. The structure was dried at 100° C. for one-half hour and then heated at a temperature of 300° C. for thirty minutes. The structure was removed from the heating furnace and rapidly cooled by placing the structure between two cold (room temperature or lower) metal plates. The rapid cooling between the metal plates apparently avoids, or substantially avoids, rupturing of the PTFE to metal bond which occurs when the structure is allowed to cool slowly, apparently as a result of the lack of uniformity of the thermo-conductivity and thermo-contraction of the PTFE film and metal support. The structure obtained had good mechanical stability and the reactive catalyst adhered well to the continuous, unsintered PTFE film.

Two electrodes formed as described above were utilized in a fuel cell as shown in FIG. 1 of the drawing. The catalyst of the structure was in contact with the electrolyte and the continuous PTFE film in contact with the reactant. A free-flowing 5 normal potassium hydroxide electrolyte was circulated in the cell through inlet A and outlet B. Pure hydrogen gas was fed at a pressure of ½ p.s.i.g. into compartment H and to anode J through inlet F, with excess gas, if any, being vented through outlet G. Air at ½ p.s.i.g. was fed into compartment K and to cathode L through inlet D with impurities being vented through outlet E. Electrical current was removed through external circuit M. At 70° C., the cell produced a current of greater than 150 milliamps per square centimeter at 0.85 volt. After continuous operation of the cell for 500 hours, there was no indication of electrolyte leakage or seepage through the electrodes or deterioration of cell performance.

An identical cell, with the exception that sintered continuous PTFE films were employed in constructing the electrodes in place of the unsintered films and the heat treatment of the electrodes occurred at a temperature of 350° C., gave an initial current density of less than 100 milliamps per square centimeter at 0.85 volt when operated under the same conditions. After a period of 50 hours, the electrode showed signs of leakage with a substantial drop in cell performance.

EXAMPLE 2

A metal/air battery was constructed substantially as shown in FIGS. 2 and 3. The battery comprised a zinc anode 1 and a composite cathode 2 composed of an unsintered polytetrafluoroethylene membrane 2.1 coated on one surface with a uniform layer 2.2 of platinum black intermixed with particles of polytetrafluoroethylene and a 30 percent potassium hydroxide electrolyte. The PTFE membrane had a thickness of 7 mils. The catalytic layer having a thickness of 2 mils was applied to the polymer membrane by rolling an aqueous paste of the platinum black and PTFE particles onto the membrane and removing the water by mild heating. An expanded nickel mesh 2.3 was pressed into the catalytic surface to improve the electrical conductivity of the cathode. [In the drawing, the nickel mesh is in contact with the interior of the envelope cathode. It is seen from the second surface because of the thinness of the membrane.] The entire structure was then heated at a temperature of 300° C. for thirty minutes and thereafter rapidly cooled by passing the structure between metal plates maintained at room temperature. After the cathode was made, it was fabricaed into a hard phenol-formaldehyde resin frame 2.4 to form the envelope bi-cathode. The consumable zinc anode 1 is wrapped in a separator paper 1.1 which is impregnated with the electrolyte of the cell. The zinc anode which is a porous structure has a nickel mesh screen 1.2 in the center thereof to provide structural support and increased conductivity. Electrical lead 2.5 is in contact with the cathode and electrical lead 1.3 in contact with the anode. There is an opening 3 in the top of anode cover 1.4 to permit the addition of electrolyte to the cell.

When operated at ambient temperature, the cell provided an open circuit voltage of 1.45 volts and had a coulombic capacity of 30 ampere hours at a three-hour rate. The cell had a three-hour rate of 125 watt hours per pound, a two-hour rate of 100 watt hours per pound, and a one-hour rate of 65 watt hours per pound.

In the above examples, the metal support screen can be replaced with other metal supports such as copper, silver, gold, stainless steel and platinum. Additionally, the catalytic metal adjacent the unsintered PTFE film can be replaced by other electrochemically active materials including nickel, gold, silver, palladium, ruthenium, and rhodium or amalgams of silver, amalgams of gold, oxides and the like. The anode of the air battery can be replaced by other materials including cadmium, aluminum, iron, etc. It is only essential that the anode selected be compatible with the electrolyte of the cell and exhibits a potential more negative than oxygen. Furthermore, the collodial PTFE which is employed in the catalyst material can be replaced by other fluorocarbon polymers including polytrifluorochloroethylene, polyvinylfluoride, polyvinylidenefluoride, polytrifluoroethylene, co-polymers thereof and silicone rubber.

It should be appreciated that the instant invention is not to be construed as being limited by the illustrative examples. It is possible to produce still other embodiments without departing from the inventive concept herein disclosed. Such embodiments are within the ability of one skilled in the art.

It is claimed:

1. An electrochemical device comprising a fuel electrode, an oxidant electrode, and an electrolyte in contact with each of said electrodes, at least one of said electrodes being non-consumable and electrochemically active with a reactant material and comprising a continuous polytetrafluoroethylene film fabricated below the transition temperature of polytetrafluoroethylene which is 327° C., said film being gas permeable and free from liquid aqueous electrolyte seepage and a catalytic material comprising an electrocatalyst in intimate contact with one surface of said film, said catalytic material being in contact with the electrolyte of the device and said polytetrafluoroethylene film being exposed to said reactant material, said electrode being fabricated at a temperature below the transition temperature of polytetrafluoroethylene, which is 327° C.

2. The electrochemical device of claim 1 wherein the catalytic material comprises a uniform admixture of electrocatalyst and silicone rubber.

3. The electrochemical device of claim 1 wherein the catalytic material comprises a uniform admixture of electrocatalyst and a fluorocarbon polymer.

4. The electrochemical device of claim 3 wherein the fluorocarbon polymer is polytetrafluoroethylene.

5. The electrochemical device of claim 1 wherein the electrocatalyst comprises silver.

6. The electrochemical device of claim 1 wherein the electrocatalyst comprises platinum.

7. The electrochemical device of claim 1 wherein the electrocatalyst comprises palladium.

8. The electrochemical device of claim 1 wherein the electrocatalyst comprises gold.

9. The electrochemical device of claim 1 wherein the electrocatalyst comprises nickel.

10. The electrochemical device of claim 1 wherein both the fuel electrode and oxidizing electrode are non-consumable.

11. The electrochemical device of claim 1 wherein the fuel electrode is consumable and comprises zinc.

12. The electrochemical device of claim 1 wherein the fuel electrode is consumable and comprises cadmium.

13. The electrochemical device of claim 1 wherein the fuel electrode is consumable and comprises magnesium.

14. The electrochemical device of claim 1 wherein the fuel electrode is consumable and comprises aluminum.

15. The electrochemical device of claim 1 wherein the continuous polytetrafluoroethylene film has a specific gravity of from about 1.2 to about 1.9, and has a thickness of from about 0.5 mil to about 20 mils.

16. The electrochemical device of claim 15 wherein the thickness of the film is from about 4 to about 7 mils.

17. The device of claim 1 wherein the non-consumable electrode includes a porous support.

18. The device of claim 17 wherein the porous support is porous carbon.

19. The device of claim 17 wherein the porous support is a metal screen.

References Cited

UNITED STATES PATENTS

| | | | |
|---|---|---|---|
| 3,116,170 | 12/1963 | Williams et al. | 136—86 |
| 3,125,468 | 3/1964 | Thompson et al. | 136—86 |
| 3,238,068 | 3/1966 | Hipp | 136—120 |
| 3,276,909 | 10/1966 | Moos | 136—86 |
| 3,288,653 | 11/1966 | Holt et al. | 136—120 |
| 3,291,753 | 12/1966 | Thompson | 252—447 |
| 3,297,489 | 1/1967 | Feng et al. | 136—120 |
| 3,337,369 | 8/1967 | Frazier | 136—86 |
| 3,356,538 | 12/1967 | Miekka et al. | 136—120 |
| 3,385,780 | 5/1968 | Feng | 204—294 |
| 2,782,180 | 2/1957 | Weidman | 260—41 |
| 3,419,900 | 12/1968 | Elmore et al. | 136—86 |
| 3,432,355 | 3/1969 | Niedrach et al. | 136—86 |
| 3,378,406 | 4/1968 | Rosansky | 136—86 |
| 3,385,736 | 5/1968 | Deibert | 136—120 |

WINSTON A. DOUGLAS, Primary Examiner

A. SKAPARS, Assistant Examiner

U.S. Cl. X.R.

136—120